(12) United States Patent
Li et al.

(10) Patent No.: US 11,580,980 B2
(45) Date of Patent: Feb. 14, 2023

(54) METHOD AND APPARATUS FOR EVALUATING USER INTENTION UNDERSTANDING SATISFACTION, ELECTRONIC DEVICE AND STORAGE MEDIUM

(71) Applicant: Beijing Baidu Netcom Science and Technology Co., Ltd., Beijing (CN)

(72) Inventors: Yanyan Li, Beijing (CN); Jianguo Duan, Beijing (CN); Hui Xiong, Beijing (CN)

(73) Assignee: Beijing Baidu Netcom Science and Technology Co., Ltd.

( * ) Notice: Subject to any disclaimer, the term of this patent is extended or adjusted under 35 U.S.C. 154(b) by 85 days.

(21) Appl. No.: 17/155,783

(22) Filed: Jan. 22, 2021

(65) Prior Publication Data

US 2021/0383802 A1  Dec. 9, 2021

(30) Foreign Application Priority Data

Jun. 5, 2020  (CN) .......................... 202010508156.6

(51) Int. Cl.
| | |
|---|---|
| *G10L 15/18* | (2013.01) |
| *G10L 15/22* | (2006.01) |
| *G06F 3/16* | (2006.01) |
| *G10L 15/07* | (2013.01) |
| *G10L 15/14* | (2006.01) |
| *G10L 15/16* | (2006.01) |

(52) U.S. Cl.
CPC .............. *G10L 15/22* (2013.01); *G06F 3/167* (2013.01); *G10L 15/075* (2013.01); *G10L 15/144* (2013.01); *G10L 15/16* (2013.01); *G10L 15/1822* (2013.01); *G10L 2015/223* (2013.01)

(58) Field of Classification Search
CPC ..... G10L 15/22; G10L 15/075; G10L 15/144; G10L 15/16; G10L 15/1822; G06F 3/167
USPC ........................................................ 704/232
See application file for complete search history.

(56) References Cited

U.S. PATENT DOCUMENTS 10,440,167 B2 * 10/2019 Choi ...................... G06F 3/0482
10,977,319 B2 *  4/2021 Bright ................. G06F 11/3438
(Continued)

*Primary Examiner* — Susan I McFadden
(74) *Attorney, Agent, or Firm* — Husch Blackwell LLP

(57) ABSTRACT

A method and apparatus for generating a user intention understanding satisfaction evaluation model, a method and apparatus for evaluating a user intention understanding satisfaction, an electronic device and a storage medium are provided, relating to intelligent voice recognition and knowledge graphs. The method for generating a user intention understanding satisfaction evaluation model is: acquiring a plurality of sets of intention understanding data, at least one set of which comprises a plurality of sequences corresponding to multi-round behaviors of an intelligent device in multi-round man-machine interactions; and learning the plurality of sets of intention understanding data through a first machine learning model, to obtain the user intention understanding satisfaction evaluation model after the learning, wherein the user intention understanding satisfaction evaluation model is configured to evaluate user intention understanding satisfactions of the intelligent device in the multi-round man-machine interactions according to the plurality of sequences corresponding to the multi-round man-machine interactions.

20 Claims, 5 Drawing Sheets

(56) References Cited

U.S. PATENT DOCUMENTS

| | | | |
|---|---|---|---|
| 11,068,942 B2* | 7/2021 | Briancon | G06N 5/022 |
| 11,302,311 B2* | 4/2022 | Kim | G10L 15/22 |
| 11,373,641 B2* | 6/2022 | Wang | G06F 3/167 |

* cited by examiner

METHOD AND APPARATUS FOR EVALUATING USER INTENTION UNDERSTANDING SATISFACTION, ELECTRONIC DEVICE AND STORAGE MEDIUM

CROSS-REFERENCE TO RELATED APPLICATION

This application claims priority to Chinese Patent Application No. 202010508156.6, filed on Jun. 5, 2020, which is hereby incorporated by reference in its entirety.

TECHNICAL FIELD

The present application relates to a field of artificial intelligence technology, and in particular to a method for generating a user intention understanding satisfaction evaluation model, a method and apparatus for evaluating a user intention understanding satisfaction, an electronic device and a storage medium. The present application can be applied to the fields of intelligent voice recognition and knowledge graphs.

BACKGROUND

With the improvement of artificial intelligence algorithms and hashrate, intelligent voice products are rapidly popularizing, and different types of intelligent voice products can be widely used in a variety of application scenarios. For an intelligent voice product, it is very important to enable efficient and accurate voice recognition and intention understanding of user instructions to be implemented. Thus, an ability of voice recognition and intention understanding is an important indicator for evaluating a degree of intelligence of the intelligent voice product. How to reasonably evaluate an accuracy of intention understanding by the intelligent voice product and make an evaluation result truly reflect a performance of the intelligent product is a focus and hotspot of research by the research and development personnel.

SUMMARY

A method and apparatus for generating a user intention understanding satisfaction evaluation model, a method and apparatus for evaluating a user intention understanding satisfaction, an electronic device and a storage medium are provided according to embodiments of the application.

In a first aspect, a method for generating a user intention understanding satisfaction evaluation model is provided according to an embodiment of the application, the method including:
acquiring a plurality of sets of intention understanding data, at least one set of which includes a plurality of sequences corresponding to multi-round behaviors of an intelligent device in multi-round man-machine interactions; and
learning the plurality of sets of intention understanding data through a first machine learning model, to obtain the user intention understanding satisfaction evaluation model after the learning, wherein the user intention understanding satisfaction evaluation model is configured to evaluate user intention understanding satisfactions of the intelligent device in the multi-round man-machine interactions according to the plurality of sequences corresponding to the multi-round man-machine interactions.

In a second aspect, a method for evaluating a user intention understanding satisfaction is provided according to an embodiment of the application, the method including:
acquiring information of multi-round behaviors of an intelligent device in multi-round man-machine interactions to be evaluated;
serializing the information of the multi-round behaviors, to obtain a plurality of sequences; and
inputting the plurality of sequences into a user intention understanding satisfaction evaluation model, to obtain evaluation results of user intention understanding satisfactions to be outputted by the model, wherein the user intention understanding satisfaction evaluation model is configured to evaluate the user intention understanding satisfactions of the intelligent device in the multi-round human-computer interactions according to the plurality of sequences corresponding to the multi-round human-computer interactions.

In a third aspect, an apparatus for generating a user intention understanding satisfaction evaluation model is provided according to an embodiment of the application, the apparatus including:
an acquisition module configured to acquire a plurality of sets of intention understanding data, at least one set of which includes a plurality of sequences corresponding to multi-round behaviors of an intelligent device in multi-round man-machine interactions; and
a learning module configured to learn the plurality of sets of intention understanding data through a first machine learning model, to obtain the user intention understanding satisfaction evaluation model after the learning, wherein the user intention understanding satisfaction evaluation model is configured to evaluate user intention understanding satisfactions of the intelligent device in the multi-round man-machine interactions according to the plurality of sequences corresponding to the multi-round man-machine interactions.

In a fourth aspect, an apparatus for evaluating a user intention understanding satisfaction is provided according to an embodiment of the application, the apparatus including:
an acquisition module configured to acquire information of multi-round behaviors of an intelligent device in multi-round man-machine interactions to be evaluated;
a serialization processing module configured to serialize the information of the multi-round behaviors, to obtain a plurality of sequences; and
an evaluation module configured to input the plurality of sequences into a user intention understanding satisfaction evaluation model, to obtain evaluation results of user intention understanding satisfactions to be outputted by the model, wherein the user intention understanding satisfaction evaluation model is configured to evaluate the user intention understanding satisfactions of the intelligent device in the multi-round human-computer interactions according to the plurality of sequences corresponding to the multi-round human-computer interactions.

In a fifth aspect, a user intention understanding satisfaction evaluation model is provided according to an embodiment of the application, wherein the user intention understanding satisfaction evaluation model is generated based on the aforementioned method for generating the user intention understanding satisfaction evaluation model.

In a sixth aspect, an electronic device is provided according to an embodiment of the application, the electronic device including:
at least one processor; and
a memory communicatively connected to the at least one processor, wherein the memory stores instructions executable by the at least one processor, and the instructions, when executed by the at least one processor, enable the at least one processor to perform the aforementioned method.

In a seventh aspect, a non-transitory computer-readable storage medium storing computer instructions is provided according to an embodiment of the application, wherein the computer instructions cause a computer to perform the aforementioned method.

It should be understood that the content described in this section is not intended to identify the key or important features of the embodiments of the present application, or to limit the scope of the present application. Other features of the present application will be easily understood through the following description.

BRIEF DESCRIPTION OF THE DRAWINGS

The drawings are used to better understand the solutions and do not constitute a limitation to the present application, wherein.

DETAILED DESCRIPTION

The exemplary embodiments of the present application will be described below in combination with the drawings, including various details of the embodiments of the present application to facilitate understanding, which should be considered as only exemplary. Therefore, those of ordinary skill in the art should realize that various changes and modifications can be made to the embodiments described herein without departing from the scope and spirit of the present application. Likewise, descriptions of well-known functions and structures are omitted in the following description for clarity and conciseness.

According to a relationship between internal intention understanding and an external operation behavior by an intelligent voice device for a voice instruction in a man-machine interaction procedure, the embodiments of the present application proposes to serialize multi-round operation behaviors of the intelligent voice device in the man-machine interaction procedure, and evaluate a user's satisfaction with the intention understanding by the intelligent voice device based on a series of serialized data, which can reflect an intention understanding performance of the intelligent voice device for a voice instruction.

Figure 1:
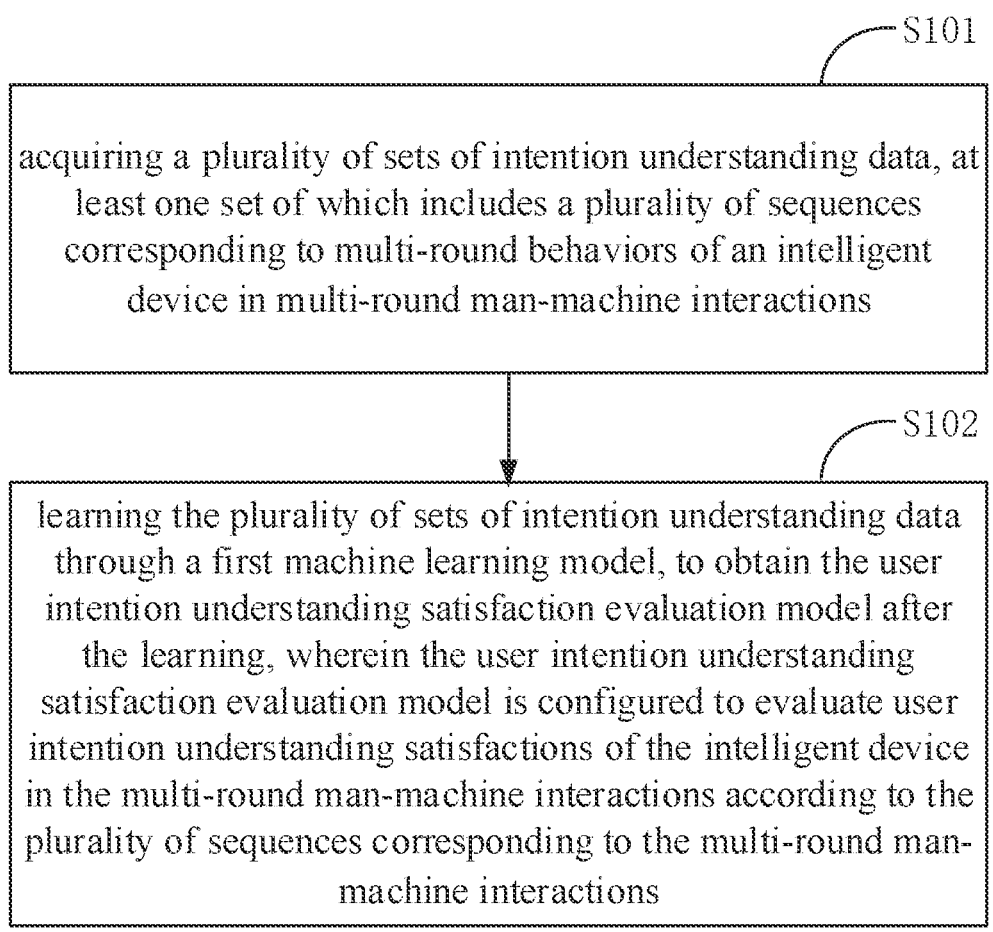
FIG. 1 is a flow block diagram showing a method for generating a user intention understanding satisfaction evaluation model according to an embodiment of the present application.
Figure 2:
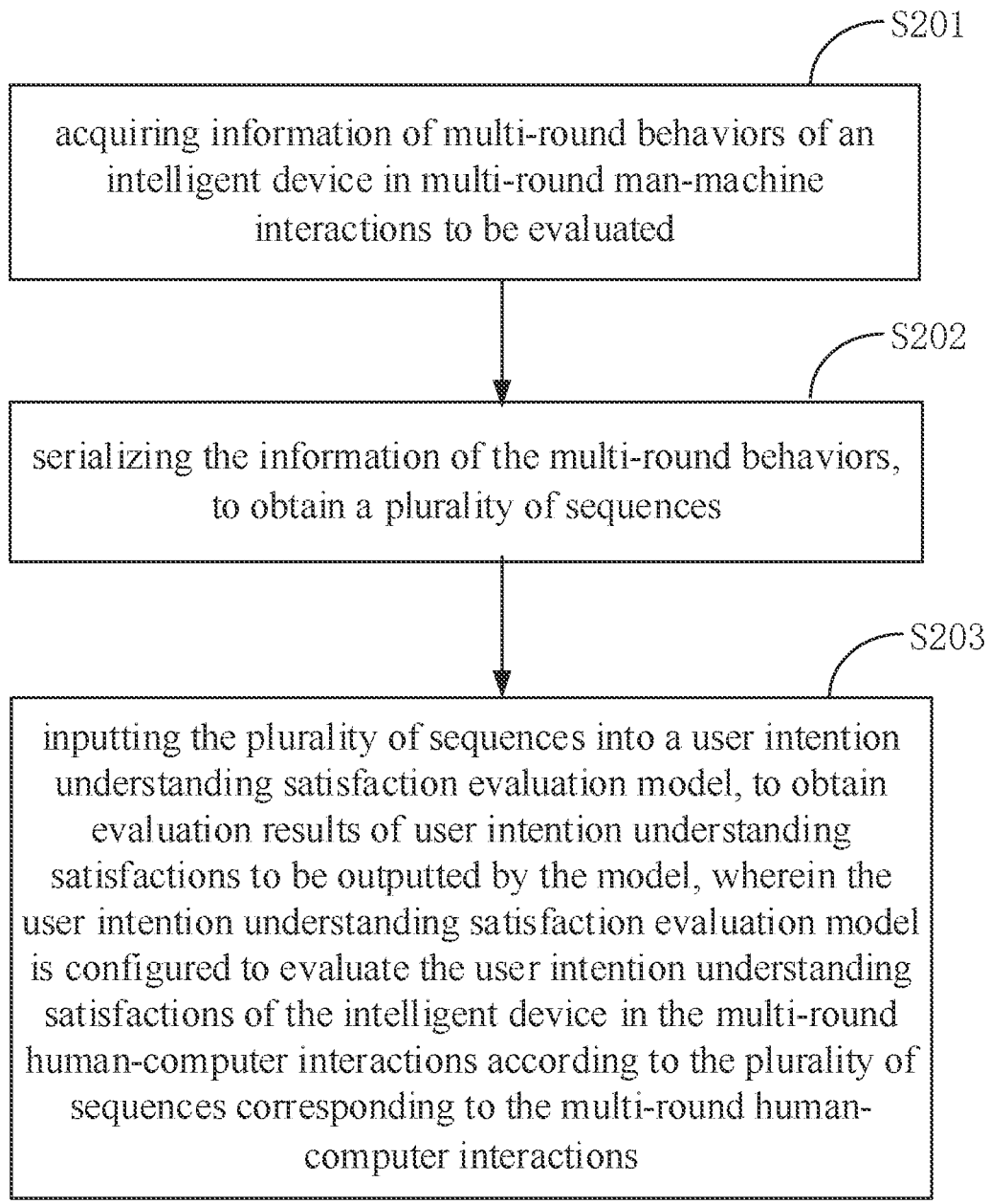
FIG. 2 is a flow block diagram showing a method for evaluating a user intention understanding satisfaction according to an embodiment of the present application.

On this basis, FIG. 1 is a flow block diagram showing a method for generating a user intention understanding satisfaction evaluation model according to an embodiment of the present application, the method including:

S101, acquiring a plurality of sets of intention understanding data, at least one set of which includes a plurality of sequences corresponding to multi-round behaviors of an intelligent device in multi-round man-machine interactions; and S102, learning the plurality of sets of intention understanding data through a first machine learning model, to obtain the user intention understanding satisfaction evaluation model after the learning, wherein the user intention understanding satisfaction evaluation model is configured to evaluate user intention understanding satisfactions of the intelligent device in the multi-round man-machine interactions according to the plurality of sequences corresponding to the multi-round man-machine interactions.

According to the embodiment of the present application, firstly a plurality of sets of intention understanding data is acquired, which may be data collected for one intelligent device or a plurality of intelligent devices. Each set of data includes a plurality of sequences corresponding to multi-round man-machine interactions, wherein one sequence corresponds to a behavior of the intelligent device in one round of man-machine interaction. Here, since the behavior of the intelligent device is an operation behavior after the intention understanding of a voice instruction by the intelligent device, the behaviors of the intelligent device are serialized so that the intention understanding by the intelligent device is abstracted into analyzable data, which is prepared for a next step of training a machine learning model.

According to the embodiment of the present application, a machine learning model is used to learn a plurality of sets of intention understanding data, to determine a model parameter, thereby constructing a model capable of evaluating a user intention understanding satisfaction of the intelligent device, and an evaluation result can reflect an intention understanding ability of the intelligent device, and can be applied to the fields of intelligent voice recognition and knowledge graphs.

In the embodiment of the present application, optionally, multi-round man-machine interactions corresponding to a plurality of sequences in a same set of intention understanding data should be continuous. Data of the multi-round continuous man-machine interactions can be used to truly reflect a relationship between operation behaviors occurring during the interaction between the user and the intelligent device.

For example, in a case where the user issues a same instruction for a plurality of times in succession, it may be considered that the intelligent device has an incorrect intention understanding of the instruction, and the feedback information does not meet the user's need, which causes the user to issue the same instruction again and again. At this time, the user intention understanding satisfaction of the intelligent device is determined to be unsatisfied or inaccurate, or other similar expressions.

In the embodiment of the present application, optionally, the plurality of sequences include a first sequence corresponding to a behavior category, to which a first behavior of the intelligent device belongs. Similarly, a second sequence in the plurality of sequences corresponds to a behavior category, to which a second behavior of the intelligent device belongs, and the rest of the sequences are deduced by analogy.

In the embodiment of the present application, the behaviors of the intelligent device may be serialized based on reasonable classification of various operation behaviors of the intelligent device. For example, according to attributes of the instructions that can be recognized by the intelligent device, or attributes of the operation behaviors of the intelligent device, the operation behaviors may be classified into a control category (001), an audio-visual category (002), a game category (003), an information category (004), an education category (005), a leisure category (006), a home control category (007), etc., wherein a bracketed number is a serial number for a category.

In the embodiment of the present application, the behavior categories and the serial numbers should be in a one-to-one corresponding relationship. The specific format and value of the serial number may be set as needed, and there is no special limitation in the embodiment of the present application.

In the embodiment of the present application, if a first-round behavior in the multi-round behaviors belongs to a first behavior category, the first-round behavior is labeled as the first sequence; and if a second-round behavior in the multi-round behaviors belongs to a second behavior category, the second-round behavior is labeled as the second sequence.

In this way, each operation behavior of the intelligent device may be classified in a set classification manner, and a serial number thereof may be determined. For example, "Play a song" is an operation behavior of the audio-visual category, with a serial number of 002;

"Volume up" is an operation behavior of the control category, with a serial number of 001;

"Broadcast destination weather" is an operation behavior of the information category, with a serial number of 004;

"Play course training video" is an operation behavior of the audio-visual category or the education category, with a serial number of 002 or 005.

In the embodiment of the present application, further, the operation behaviors of the intelligent device may be classified in levels, so that the classification is more refined and accurate, a granularity of the evaluation is reduced, and the evaluation result is more accurate.

In one embodiment, the plurality of sequences include a second sequence, which includes a first subsequence and a second subsequence, wherein the first subsequence corresponds to a first-level behavior category, to which a second behavior of the intelligent device belongs, and the second subsequence corresponds to a second-level behavior category, to which the second behavior of the intelligent device belongs, and wherein one first-level behavior category includes one or more second-level behavior categories.

In the embodiment of the present application, the classification manner described above may be regarded as a first-level classification, and on this basis, each operation category in the first-level classification may be subdivided into second-level classifications.

Illustratively, specific examples are given below for description.

The first-level classification may include the following categories:

a control category (001), an audio-visual category (002), a game category (003), an information category (004), an education category (005), a leisure category (006), a home control category (007), etc.

The second-level classification subdivides the categories in the first-level classification as follows:

1) the control category (001) in the first-level classification may be subdivided into: volume up (0001), volume down (0002), exit application (0003), shut down (0004), basic settings (0005), wake up (0006), etc.;

2) the audio-visual category (002) in the first-level classification may be subdivided into: song playback (0001), video playback (0002), playlist (0003), progress adjustment (0004), change the song (0005), song information (0006), singer information (0007), play video (0008), video information (0009), play completed (0010), etc.:

3) the information category (004) in the first-level classification may be subdivided into: weather check (0001), play completed (0002), etc.

Those bracketed in the above example are serial numbers corresponding to various categories. A serial number of the first-level classification and a serial number of the second-level classification may be superimposed as a serial number of a specific operation behavior.

In practical applications, suitable first-level classification and second-level classification may be set according to the evaluation need and the characteristics of the intelligent device per se, and they are not exhaustive in the above examples.

Based on the above multi-level classification principle, serializing the information of the multi-round behaviors in the embodiment of the present application may include the following steps:

if a first-round behavior in the multi-round behaviors belongs to a first behavior category in a first-level behavior category set and also belongs to a second behavior category in a second-level behavior category set, labeling the first-round behavior as a superimposed sequence of a first sequence and a second sequence, wherein the first sequence and the second sequence correspond to the first behavior category and the second behavior category, respectively;

if a second-round behavior in the multi-round behaviors belongs to a third behavior category in the first-level behavior category set and also belongs to a fourth behavior category in the second-level behavior category set, labeling the second-round behavior as a superimposed sequence of a third sequence and a fourth sequence, wherein the third sequence and the fourth sequence correspond to the third behavior category and the fourth behavior category, respectively.

In order to more clearly explain a relationship between a code of a control behavior sequence of the intelligent device and a user intention understanding satisfaction in the embodiment of the present application, a specific example is given as follows to describe a procedure of multi-round human-machine interactions between a user and an intelligent speaker.

In the procedure of multi-round human-machine interactions, the user issues a voice instruction to the intelligent speaker, which performs intension understanding on the voice instruction after recognizing the voice instruction, and makes an answer feedback and a corresponding operation behavior according to the intension understanding.

Specifically, the answering procedure of the instruction of the user and the intelligent speakers includes:

Instruction 1: Xiaodu Xiaodu;
Answer 1: I am here; (0010006)
Instruction 2: Play Jay Chou's songs;
Answer 2: Okay, I will play "Fragrant miles and miles"; (0020001, 0020010) and "Confession Balloon"; (0020001)
Instruction 3: Next song;
Answer 3: Okay, I will play "Listen To Mother's Words"; (0020005)
Instruction 4: The voice would better be higher;
Answer 4: Volume up; (0010001)
Instruction 5: Weather in Beihai;

Answer 5: Weather in Shanghai is; (0040001) [an error of intention understanding occurs]

Instruction 6: Weather in Beihai, Guangxi Zhuang Autonomous Region;

Answer 6: Weather in Beihai; (0040001, 0040002)

Instruction 7: Exit;

Answer 7: Exit. (0010003)

For the convenience of description, sequences of the operation behaviors of the intelligent speaker have been listed in corresponding brackets. For example, Answer 1 is "I am here", wherein this operation behavior is that the device is waked up, which corresponds to "control category (001)" in the first-level classification and "wake up (0006)" in the second-level classification. Thus, a sequence corresponding to the behavior "I am here" in Answer 1 is 0010006, and a code of this sequence is a superposition of the serial number of the first-level classification and the serial number of the second-level classification. In addition, the intelligent speaker is successfully waked up, and a result of the intention understanding of the instruction is "satisfied".

It should be noted that for Answer 5, the intention of Instruction 5 is to check the weather in Beihai, while Answer 5 broadcasts the weather in Shanghai (in fact, an error of intention understanding of Instruction 5 occurs). At this time, the user interrupts the broadcast of the weather in Shanghai, issues Instruction 6 that is intended to check the weather in Beihai, Guangxi Zhuang Autonomous Region. It can be seen that Instruction 6 is actually a repetition of Instruction 5, and Answer 7 of the intelligent speaker broadcasts the weather in Beihai. In addition, this broadcast is completed without being interrupted, and the intension understanding is correct.

As can be seen from the above two interactions, Answer 6 and Answer 5 both broadcast the weather, so the sequences of the two operation behaviors both have 0040001; further, Answer 6 completes the broadcast, and corresponding sequence is added with 0040002, while Answer 5 does not complete the broadcast, and there is no corresponding sequence. From the analysis of the two answering behaviors, it can be concluded that the intelligent device understands the intention of Instruction 5 incorrectly, and the user is not satisfied, while the intention of Instruction 6 is correctly understood, and the user is satisfied.

Therefore, from the above multi-round human-computer interactions, a plurality of operation behavior sequences (denoted as $o_t$) and the corresponding user intention understanding satisfactions (denoted as $i_t$) may be obtained as follows:

0010006 (satisfied), 0020001 (satisfied), 0020010 (satisfied), 0020001 (satisfied), 0020005 (satisfied), 0010001 (satisfied), 0040001 (unsatisfied), 0040001 (satisfied), 0040002 (satisfied), 0010003 (satisfied).

In the embodiment of the present application, optionally, a large number of operation behavior sequences and corresponding user intention understanding satisfactions are taken as training sample data to train a neural network, such as a convolutional neural network or a recurrent neural network, so as to obtain a user intention understanding satisfaction evaluation model, which can applied to the fields of intelligent voice recognition and knowledge graphs.

In the embodiment of the present application, optionally, a Hidden Markov Model (HMM) may also be taken as a machine learning model to be trained or learned. Optionally, based on the aforementioned operation behavior sequences and the corresponding user intention understanding satisfactions, a model parameter is learned in a supervised learning manner to generate the user intention understanding satisfaction evaluation model. Optionally, the user intention understanding satisfaction evaluation model may also be generated by learning the model parameter in an unsupervised learning manner based only on the aforementioned operation behavior sequences.

On this basis, a method for evaluating a user intention understanding satisfaction is also provided according to an embodiment of the present application, the method including:

S201, acquiring information of multi-round behaviors of an intelligent device in multi-round man-machine interactions to be evaluated;

S202, serializing the information of the multi-round behaviors, to obtain a plurality of sequences; and S203, inputting the plurality of sequences into a user intention understanding satisfaction evaluation model, to obtain evaluation results of user intention understanding satisfactions to be outputted by the model, wherein the user intention understanding satisfaction evaluation model is configured to evaluate the user intention understanding satisfactions of the intelligent device in the multi-round human-computer interactions according to the plurality of sequences corresponding to the multi-round human-computer interactions.

Through the embodiments of the present application, the evaluation of the user intention understanding satisfactions of the intelligent device can be realized based on the behavior sequences of the intelligent device during the multi-round man-machine interactions.

For example, when it is necessary to evaluate the performance of a certain intelligent device, such as the ability of intension understanding, an operator may acquire information of a series of operation behaviors during multi-round human-computer interactions with the intelligent device, and perform serialization thereof, for example, perform classification and serialization according to the classification principle provided in the embodiments of the present application, and input results into the user intention understanding satisfaction evaluation model to obtain evaluation results of the user intention understanding satisfactions of the multi-round human-computer interactions. The evaluation results may be a series of satisfaction states, and the ability of intension understanding of the intelligent device improves as the number of "satisfied" increases.

In the embodiment of the present application, as described above, a Hidden Markov Model may be constructed based on the operation sequences for the intension understanding, because first of all, supposing that the operation sequences of the user satisfy the Markov property and the observation independence assumption, that is, the state variable sequences are arranged in a chronological order, and the distribution characteristics at a moment N+1 are related to the distribution at a moment N, regardless of the value of the variable before the moment N. The plurality of operation behavior sequences in the embodiment of the present application are denoted as $o_t$, the user intention understanding satisfactions are denoted as $i_t$, and $P(i_t|i_{t-1}, o_{t-1}, \ldots, i_1, o_1) = P(i_t|i_{t-1})$, $t=1, 2, \ldots, T$, wherein P represents a probability. Regarding the observation independence assumption, the observation at any moment depends only on the state of the Markov chain at that moment, regardless of any other observation or state, i.e., $P(o_t|i_T, o_T, \ldots, i_{t+1}, o_{t+1}, i_t, i_{t-1}, o_{t-1} \ldots, i_1, o_1) = P(o_t|i_t)$.

In the embodiment of the present application, if it is supposed that the operation sequences of the user are Markovian, it means that a current operation behavior is probabilistically related to an operation behavior of a previous step, regardless of any other previous operation behavior. For example, in the above example of the multi-round human-computer interactions, the user wants to obtain the weather in Beihai, while the intelligent device broadcasts the weather in Shanghai. The user's behavior at that time is to interrupt the broadcast of the weather in Shanghai and reinitiate a question. The behavior of reinitiating the question has nothing to do with the previous operations such as listening to a song. The parameter values of the Hidden Markov Model $\lambda=(A,B,\pi)$ may be estimated based on a given user set $U=\{u_1, u_2, u_3, u_4, \ldots u_n\}$ and the operation sequence $O_i$ of each user, wherein A represents a state transition probability matrix, B represents an observation probability matrix, and c represents an initial state probability vector. A maximum likelihood estimation method may be adopted to maximize the observation sequence probability $P(O|\lambda)$ under this model, so as to obtain the learned parameter values.

In the embodiment of the present application, the model parameter values may be learnt using a supervised learning method or an unsupervised learning method. On the one hand, when using the supervised learning method, it is necessary to label a state sequence (i.e., a satisfaction sequence) corresponding to the user's operation sequence, and then estimate the parameter values of the Hidden Markov Model using the maximum likelihood estimation method. On the other hand, a Baum-Welch algorithm (EM algorithm), i.e., the unsupervised learning algorithm, may be used for unsupervised learning to obtain the constructed Hidden Markov Model.

In the evaluation, the user intention satisfaction evaluation is performed based on the constructed Hidden Markov Model. Since the Hidden Markov Model $\lambda=(A,B,\pi)$ and the operation sequence $O_i=(o_1, o_2, \ldots o_T)$ of the intelligent device have been known, a Viterbi algorithm is adopted to solve a path of a maximum probability through dynamic planning, so as to obtain a sequence $I_i=(i_1, i_2 \ldots i_T)$ in a state with a maximum conditional probability $P(I|O)$ of the given operation sequence, wherein nodes on the path each correspond to a satisfied or unsatisfied state, thereby obtaining the satisfaction sequence corresponding to the operation sequence, i.e., the evaluation result of the user intention understanding satisfaction of the intelligent device.

According to the embodiments of the present application, the behaviors of the intelligent device are serialized, so that the intention understanding by the intelligent device is converted into analyzable data, to enable a suitable machine learning model to be constructed, to realize the evaluation of the user intention understanding satisfaction.

Figure 3:
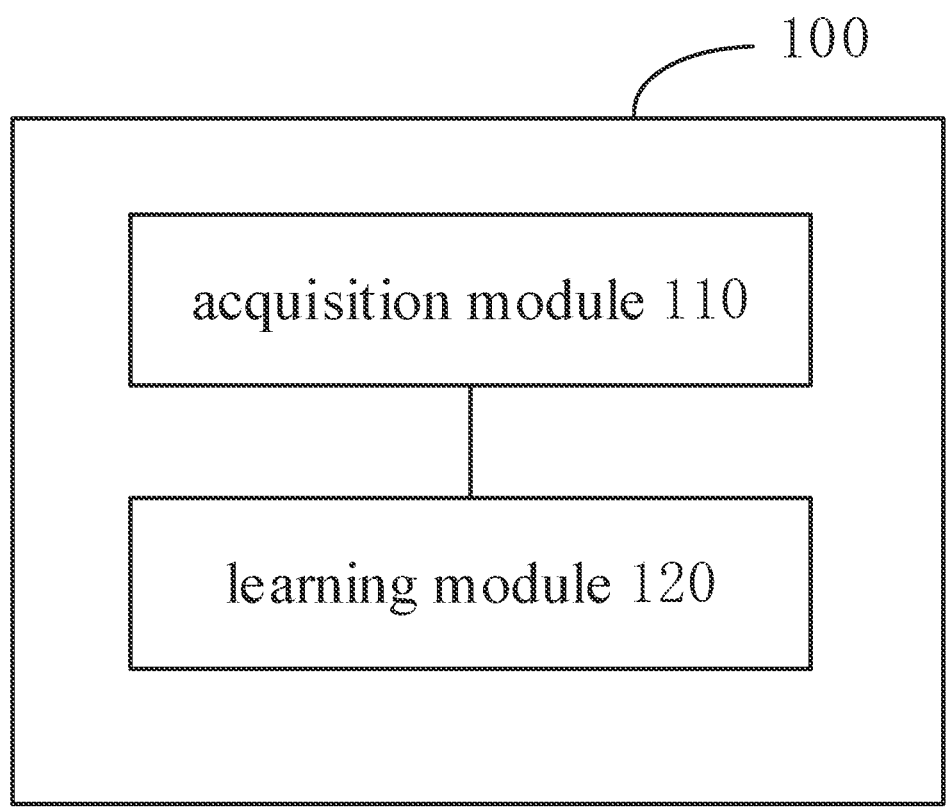
FIG. 3 is a structural block diagram showing an apparatus for generating a user intention understanding satisfaction evaluation model according to an embodiment of the present application.

The specific settings and implementations of the embodiments of the present application are described as above from different perspectives through several embodiments. Corresponding to the processing method of at least one of the above embodiments, an apparatus 100 for generating a user intention understanding satisfaction evaluation model is also provided according to an embodiment of the present application, as shown in FIG. 3, the apparatus including:

an acquisition module 110 configured to acquire a plurality of sets of intention understanding data, at least one set of which includes a plurality of sequences corresponding to multi-round behaviors of an intelligent device in multi-round man-machine interactions; and a learning module 120 configured to learn the plurality of sets of intention understanding data through a first machine learning model, to obtain the user intention understanding satisfaction evaluation model after the learning, wherein the user intention understanding satisfaction evaluation model is configured to evaluate user intention understanding satisfactions of the intelligent device in the multi-round man-machine interactions according to the plurality of sequences corresponding to the multi-round man-machine interactions.

Figure 4:
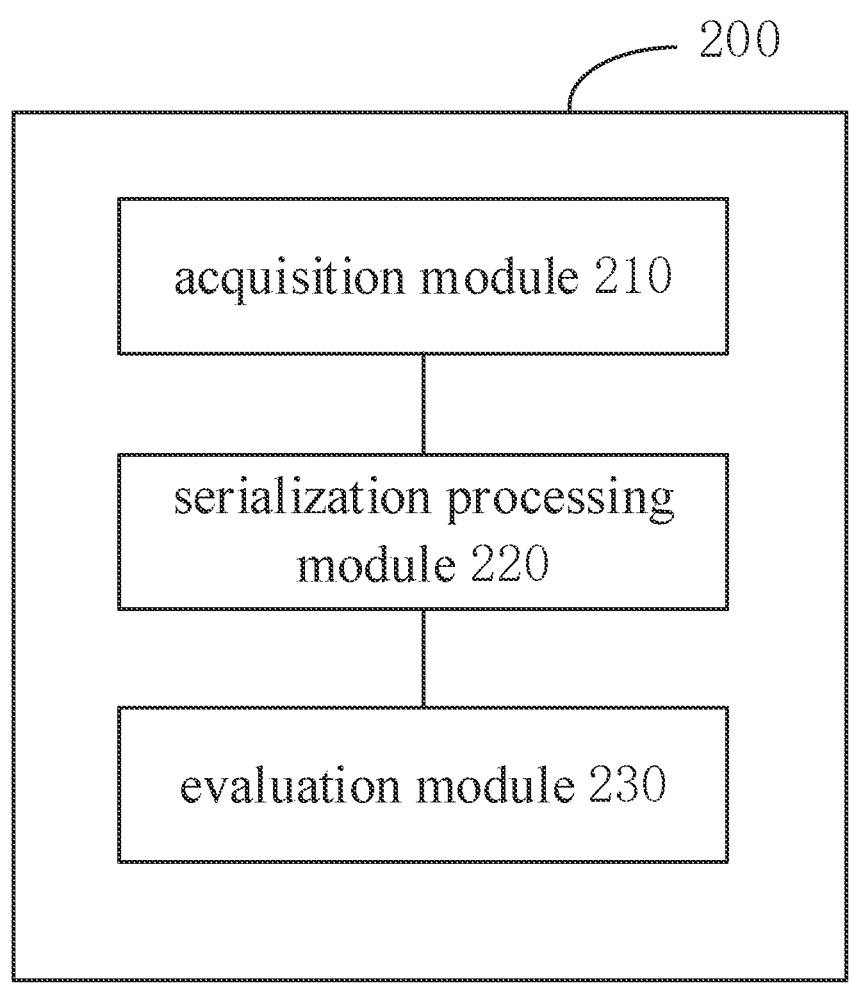
FIG. 4 is a structural block diagram showing an apparatus for evaluating a user intention understanding satisfaction according to an embodiment of the present application.

Corresponding to the processing method of at least one of the above embodiments, an apparatus 200 for evaluating a user intention understanding satisfaction is also provided according to an embodiment of the present application, as shown in FIG. 4, the apparatus including:

an acquisition module 210 configured to acquire information of multi-round behaviors of an intelligent device in multi-round man-machine interactions to be evaluated;

a serialization processing module 220 configured to serialize the information of the multi-round behaviors, to obtain a plurality of sequences; and an evaluation module 230 configured to input the plurality of sequences into a user intention understanding satisfaction evaluation model, to obtain evaluation results of the user intention understanding satisfactions to be outputted by the model, wherein the user intention understanding satisfaction evaluation model is configured to evaluate the user intention understanding satisfactions of the intelligent device in the multi-round human-computer interactions according to the plurality of sequences corresponding to the multi-round human-computer interactions.

For the functions of the modules of the apparatus in the embodiments of the present application, please refer to the corresponding processing described in the above method embodiments, which will not be repeated here.

Figure 5:
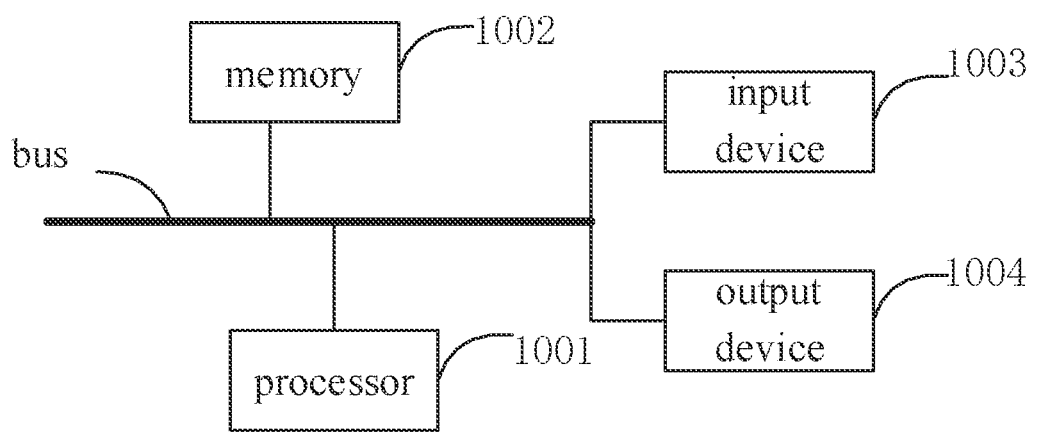
FIG. 5 is a block diagram showing an electronic device for implementing a method according to an embodiment of the present application.

An electronic device and a readable storage medium are provided according to embodiments of the present application. FIG. 5 shows a block diagram of an electronic device for the above method according to an embodiment of the present application, wherein the electronic device is intended to represent various forms of digital computers, such as a laptop computer, a desktop computer, a workstation, a personal digital assistant, a server, a blade server, a mainframe computer, and other appropriate computers. The electronic device may also represent various forms of mobile apparatuses, such as a personal digital assistant, a cellular phone, an intelligent phone, a wearable device, and other similar computing apparatuses. The components shown herein, the connections and relationships therebetween, and the functions thereof are merely examples, and are not intended to limit the implementations of the present application described and/or required herein.

As shown in FIG. 5, the electronic device includes one or more processors 1001, a memory 1002, and interfaces for connecting various components, including a high-speed interface and a low-speed interface. The various components are connected to each other using different buses, and may be installed on a common motherboard or in other ways as required. The processor may process instructions executed in the electronic device, including those stored in or on the memory to display graphical information of a Graphical User Interface (GUI) on an external input/output device (e.g., a display device coupled to an interface). In other embodiments, if necessary, a plurality of processors and/or a plurality of buses may be used together with a plurality of memories. Similarly, a plurality of electronic devices may be connected, each providing some necessary operations (e.g., as a server array, a group of blade servers, or a multi-processor system). One processor 1001 is taken as an example in FIG. 5.

The memory 1002 is a non-transitory computer-readable storage medium provided by the present application, wherein the memory stores instructions executable by at least one processor, so that the at least one processor performs the above method provided by the present application. The non-transitory computer-readable storage medium of the present application stores computer instructions enabling a computer to perform the above method provided by the present application.

As a non-transitory computer-readable storage medium, the memory 1002 may be configured to store anon-transitory software programs, non-transitory computer-executable programs, and modules, such as program instructions/modules corresponding to the above method in the embodiments of the present application (e.g., an acquisition module 110, and a learning module 120 shown in FIG. 3). The processor 1001 executes various functional applications and data processing of the server by running the non-transient software programs, instructions, and modules stored in the memory 1002, thereby implementing the method in the above method embodiments.

The memory 1002 may include a program storage area and a data storage area, wherein the program storage area may store an operating system and an application program required by at least one function, and the data storage area may store data created according to the use of the electronic device. In addition, the memory 1002 may include a high-speed random access memory, and a non-transitory memory such as at least one magnetic disk storage device, a flash memory device, or other non-transitory solid-state storage device. In some embodiments, the memory 1002 may optionally include memories remotely provided with respect to the processor 1001, and these remote memories may be connected to the electronic device through a network. Examples of the networks include, but are not limited to, the Internet, an intranet, a local area network, a mobile communication network, and combinations thereof.

The electronic device corresponding to the above method may further include: an input device 1003 and an output device 1004. The processor 1001, the memory 1002, the input device 1003, and the output device 1004 may be connected by a bus or in other ways. The connection by a bus is taken as an example in FIG. 5.

The input device 1003 may receive input digital or character information, and generate key signal input related to user settings and function control of the electronic device, and for example may be a touch screen, a keypad, a mouse, a track pad, a touch pad, an indicator stick, one or more mouse buttons, a trackball, a joystick, etc. The output device 1004 may include a display device, an auxiliary lighting means (e.g., an LED), tactile feedback means (e.g., a vibration motor), etc. The display device may include, but is not limited to, a liquid crystal display (LCD), a light emitting diode (LED) display, and a plasma display. In some embodiments, the display device may be a touch screen.

Various embodiments of the system and technology described here may be implemented in a digital electronic circuit system, an integrated circuit system, an application specific integrated circuit (ASIC), computer hardware, firmware, software, and/or combinations thereof. These embodiments may be implemented in one or more computer programs which may be executed and/or interpreted on a programmable system including at least one programmable processor. The programmable processor may be a dedicated or general programmable processor, which can receive and transmit data and instructions from and to a storage system, at least one input device and at least one output device.

These computer programs (also called as programs, software, software applications, or codes) include machine instructions of the programmable processor, and may be implemented using high-level procedures and/or object-oriented programming languages, and/or assembly/machine languages. As used herein, the terms 'machine-readable medium' and 'computer-readable medium' refer to any computer program product, device, and/or means (e.g., a magnetic disk, an optical disk, a memory, the programmable logic device (PLD)) configured to provide machine instructions and/or data to a programmable processor, including a machine-readable medium that receives machine instructions as machine-readable signals. The term 'machine-readable signal' refers to any signal configured to provide machine instructions and/or data to the programmable processor.

In order to provide an interaction with the user, the system and technology described here may be implemented on a computer that has display means for displaying information to the user (e.g., a cathode ray tube (CRT) or a liquid crystal display (LCD) monitor), and a keyboard and pointing means (e.g., a mouse or a trackball) through which the user can provide an input to the computer. Other types of means may also be used to provide an interaction with the user. For example, a feedback provided to the user may be any form of sensory feedback (e.g., a visual feedback, an auditory feedback, or a tactile feedback); and the input from the user may be received in any form (including an acoustic input, a voice input, or a tactile input).

The system and technology described here may be implemented in a computing system which includes a back-end component (e.g., a data server), or a middleware component (e.g., an application server), or a front-end component (e.g., a user computer with a graphical user interface or a web browser, through which the user can interact with the embodiment of the system and technology described here), or any combination of the background component, the middleware component, and the front-end component. The components of the system may be connected to each other by a digital data communication of any form or medium (e.g., a communication network). Examples of the communication network include a local area network (LAN), a wide area network (WAN), and the Internet.

The computer system may include a client and a server. The client and the server are generally far away from each other and usually interact with each other through a communication network. A relationship between the client and the server is generated by computer programs which run on corresponding computers and have a client-server relationship with each other.

It should be understood that the various forms of the flows shown above can be used to reorder, add or delete steps. For example, the steps described in the present application may be executed in parallel, sequentially, or in a different order, as long as the desired result of the technical solution disclosed in the present application can be achieved, which is not limited herein.

The aforementioned specific embodiments do not constitute limitations to the protection scope of the present application. Those skilled in the art should understand that various modifications, combinations, sub-combinations and substitutions can be made according to design requirements and other factors. Any modification, equivalent substitution, improvement, etc. made within the spirit and principle of the present application should be covered by the protection scope of the present application.

What is claimed is:

1. A method for generating a user intention understanding satisfaction evaluation model, comprising:

acquiring a plurality of sets of intention understanding data, at least one set of intention understanding data comprises a plurality of sequences corresponding to multi-round behaviors of an intelligent device in multi-round man-machine interactions;
wherein one sequence corresponds to a behavior of the intelligent device in one round of man-machine interaction; and
learning the plurality of sets of intention understanding data through a first machine learning model, to obtain the user intention understanding satisfaction evaluation model after the learning, wherein the user intention understanding satisfaction evaluation model is used for evaluating user's satisfactions with intention understanding by the intelligent device in the multi-round man-machine interactions according to the plurality of sequences corresponding to the multi-round man-machine interactions;
wherein the multi-round man-machine interactions comprise receiving multi-round voice instructions and feeding back respectively by an intelligent voice device.

2. The method according to claim 1, wherein the multi-round man-machine interactions corresponding to the plurality of sequences are continuous multi-round man-machine interactions.

3. The method according to claim 1, wherein
the plurality of sequences comprise a first sequence corresponding to a behavior category, to which a first behavior of the intelligent device belongs.

4. The method according to claim 1, wherein
the plurality of sequences comprise a second sequence, which comprises a first subsequence and a second subsequence, wherein
the first subsequence corresponds to a first-level behavior category, to which a second behavior of the intelligent device belongs,
the second subsequence corresponds to a second-level behavior category, to which the second behavior of the intelligent device belongs,
wherein one first-level behavior category comprises one or more second-level behavior categories.

5. The method according to claim 4, wherein
the first-level behavior category comprises at least one of the following behavior categories: a control category, an audio-visual category, an information category, an education category, a leisure category, a home control category, and a game category;
the second-level behavior category comprises at least one of the following behavior categories: wake up, volume up, volume down, exit application, basic settings, shut down, song playback, video playback, playlist, playback progress adjustment, change the song, song information, singer information, play video, video information, weather check, and play completed.

6. The method according to claim 1,
wherein in a case that a first-round voice instruction in the multi-round voice instructions is a second instruction, a second-round voice instruction is received while the intelligent voice device is playing a feedback result, and the second-round voice instruction is still the second instruction, then a user's satisfaction with the intention understanding of a sequence corresponding to the first-round voice instruction is determined to be unsatisfied.

7. The method according to claim 1, wherein
the first machine learning model comprises a Hidden Markov Model,
the plurality of sets of intention understanding data is unlabeled or labeled data.

8. The method according to claim 1, wherein
the first machine learning model comprises a neural network model, and the plurality of sets of intention understanding data is labeled data.

9. The method according to claim 1,
wherein in a case that a first-round voice instruction in the multi-round voice instructions is a first instruction, and a second-round voice instruction is still the first instruction, then a user's satisfaction with the intention understanding of a sequence corresponding to the first-round voice instruction is determined to be unsatisfied.

10. A non-transitory computer-readable storage medium storing computer instructions, wherein the computer instructions cause a computer to perform the method according to claim 1.

11. A method for evaluating a user's satisfaction with intention understanding, comprising:
acquiring information of multi-round behaviors of an intelligent device in multi-round man-machine interactions to be evaluated; wherein one sequence corresponds to a behavior of the intelligent device in one round of man-machine interaction;
serializing the information of the multi-round behaviors, to obtain a plurality of sequences; and
inputting the plurality of sequences into a user intention understanding satisfaction evaluation model, to obtain evaluation results of user's satisfactions with intention understanding to be outputted by the model, wherein the user intention understanding satisfaction evaluation model is used for evaluating the user's satisfactions with the intention understanding by the intelligent device in the multi-round human-computer interactions according to the plurality of sequences corresponding to the multi-round human-computer interactions;
wherein the multi-round man-machine interactions comprise receiving multi-round voice instructions and feeding back respectively by an intelligent voice device.

12. The method according to claim 11, wherein
the serializing the information of the multi-round behaviors comprises:
in a case that a first-round behavior in the multi-round behaviors belongs to a first behavior category in a first-level behavior category set and also belongs to a second behavior category in a second-level behavior category set, labeling the first-round behavior as a superimposed sequence of a first sequence and a second sequence, wherein the first sequence and the second sequence correspond to the first behavior category and the second behavior category, respectively; and
in a case that a second-round behavior in the multi-round behaviors belongs to a third behavior category in the first-level behavior category set and also belongs to a fourth behavior category in the second-level behavior category set, labeling the second-round behavior as a superimposed sequence of a third sequence and a fourth sequence, wherein the third sequence and the fourth sequence correspond to the third behavior category and the fourth behavior category, respectively,
wherein one first-level behavior category comprises one or more second-level behavior categories.

13. The method according to claim 11, wherein
the user intention understanding satisfaction evaluation model is generated based on a method for generating the user intention understanding satisfaction evaluation model, comprising:

acquiring a plurality of sets of intention understanding data, at least one set of intention understanding data comprises a plurality of sequences corresponding to multi-round behaviors of an intelligent device in multi-round man-machine interactions; and learning the plurality of sets of intention understanding data through a first machine learning model, to obtain the user intention understanding satisfaction evaluation model after the learning, wherein the user intention understanding satisfaction evaluation model is used for evaluating the user's satisfactions with the intention understanding by the intelligent device in the multi-round man-machine interactions according to the plurality of sequences corresponding to the multi-round man-machine interactions;

wherein the multi-round man-machine interactions comprise receiving multi-round voice instructions and feeding back respectively by an intelligent voice device.

14. The method according to claim 11, wherein
the serializing the information of the multi-round behaviors comprises:
in a case that a first-round behavior in the multi-round behaviors belongs to a first behavior category, labeling the first-round behavior as a first sequence; and
in a case that a second-round behavior in the multi-round behaviors belongs to a second behavior category, labeling the second-round behavior as a second sequence.

15. An apparatus for evaluating a user's satisfaction with intention understanding, comprising:
at least one processor; and
a memory communicatively connected to the at least one processor, wherein
the memory stores instructions executable by the at least one processor, and the instructions, when executed by the at least one processor, enable the at least one processor to perform the method according to claim 11.

16. A non-transitory computer-readable storage medium storing computer instructions, wherein the computer instructions cause a computer to perform the method according to claim 11.

17. An apparatus for generating a user intention understanding satisfaction evaluation model, comprising:
at least one processor; and
a memory communicatively connected to the at least one processor, wherein
the memory stores instructions executable by the at least one processor, and the instructions, when executed by the at least one processor, enable the at least one processor to perform operations comprising:

acquiring a plurality of sets of intention understanding data, at least one set of which comprises a plurality of sequences corresponding to multi-round behaviors of an intelligent device in multi-round man-machine interactions; wherein one sequence corresponds to a behavior of the intelligent device in one round of man-machine interaction; and learning the plurality of sets of intention understanding data through a first machine learning model, to obtain the user intention understanding satisfaction evaluation model after the learning, wherein the user intention understanding satisfaction evaluation model is used for evaluating user's satisfactions with intention understanding by the intelligent device in the multi-round man-machine interactions according to the plurality of sequences corresponding to the multi-round man-machine interactions;

wherein the multi-round man-machine interactions comprise receiving multi-round voice instructions and feeding back respectively by an intelligent voice device.

18. The apparatus according to claim 17, wherein the multi-round man-machine interactions corresponding to the plurality of sequences are continuous multi-round man-machine interactions.

19. The apparatus according to claim 17, wherein
the plurality of sequences comprise a first sequence corresponding to a behavior category, to which a first behavior of the intelligent device belongs.

20. The apparatus according to claim 17, wherein
the plurality of sequences comprise a second sequence, which comprises a first subsequence and a second subsequence, wherein
the first subsequence corresponds to a first-level behavior category, to which a second behavior of the intelligent device belongs,
the second subsequence corresponds to a second-level behavior category, to which the second behavior of the intelligent device belongs,
wherein one first-level behavior category comprises one or more second-level behavior categories.

* * * * *